United States Patent
Mie

(10) Patent No.: US 7,563,092 B2
(45) Date of Patent: Jul. 21, 2009

(54) BLOW MOLDING SYSTEM FOR THE MANUFACTURE OF THERMOPLASTIC RECEPTACLES

(75) Inventor: Patrick Mie, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 290 days.

(21) Appl. No.: 11/665,964

(22) PCT Filed: Oct. 18, 2005

(86) PCT No.: PCT/FR2005/002583

§ 371 (c)(1),
(2), (4) Date: Apr. 20, 2007

(87) PCT Pub. No.: WO2006/045925

PCT Pub. Date: May 4, 2006

(65) Prior Publication Data

US 2008/0286402 A1 Nov. 20, 2008

(30) Foreign Application Priority Data

Oct. 22, 2004 (FR) .................................. 04 11298

(51) Int. Cl.
*B29C 49/58* (2006.01)
(52) U.S. Cl. ..................................................... 425/535

(58) Field of Classification Search ................. 425/529, 425/535
See application file for complete search history.

(56) References Cited

U.S. PATENT DOCUMENTS 1,647,532 A * 11/1927 Lorenz ........................ 65/261
4,403,940 A     9/1983 Krishnamumar et al.
4,552,527 A    11/1985 Hunter

FOREIGN PATENT DOCUMENTS

FR          2 764 544 A    12/1998

* cited by examiner

*Primary Examiner*—Robert B Davis
(74) *Attorney, Agent, or Firm*—Sughrue Mion, PLLC

(57) ABSTRACT

A blow molding system for a thermoplastic blank which is supported in a mold. The system includes a fixed tubular body connected to a high-pressure fluid source and, at the lower end thereof, supporting moveable equipment consisting of a tuyere, the tuyere being defined laterally by a terminal sleeve of the moveable equipment and the bottom thereof being the front wall of the body, wherein the lateral inner wall of the sleeve is configured in such a way that the pressure of a fluid inside the tuyere does not result in a reaction force component on the lateral wall, which is directed opposite to the wall of the mold.

11 Claims, 4 Drawing Sheets

BLOW MOLDING SYSTEM FOR THE MANUFACTURE OF THERMOPLASTIC RECEPTACLES

FIELD OF THE INVENTION

The present invention relates to improvements made to blow-molding systems able to supply a blow-molding fluid at high pressure into a thermoplastic parison which is supported, in a blow-molding mold, by its neck emerging from a wall of the mold, said system comprising a stationary tubular body which is in communication with a source of high-pressure fluid and which, at its lower end, coaxially and slidably supports a movable equipment comprising a blowing nozzle able, in the blowing position, to be placed in sealed communication with the neck of the parison, the nozzle being laterally defined by a terminal part, in the form of a sleeve, of the movable equipment, the tubular body having a transverse face which lies a fixed distance from said wall of the mold.

BACKGROUND OF THE INVENTION

Various blow-molding systems of the type in question are known, particularly systems equipped with various types of nozzles either designed to be brought into physical contact with the neck of the parison that is to be blow-molded (nozzles butting in a sealed fashion against the mouth of the neck of the parison, conical nozzles engaged in sealed fashion inside the neck of the parison, nozzles fitted tightly over the neck of the parison), or designed such that they are oversized relative to the neck of the parison so as to be brought to bear frontally and in a sealed manner against the wall of the mold supporting the parison while surrounding said neck from a distance (bell-shaped nozzles: see, for example, document FR 2 764 544).

The force with which the nozzle, whatever its type, is held bearing in a sealed fashion against the neck of the parison or against the wall of the mold has to be high enough to oppose the reaction thrust, in the opposite direction, due to the high pressure (typically of the order of $40 \times 10^5$ Pa) of the blow-molding fluid which is exerted on the walls of the nozzle. This bearing force has also to be high enough to seal the cooperation between the nozzle and the neck of the parison by slight elastic deformation of the thermo-plastic material and, in the case of the bell-shaped nozzle, for the seal provided transversely across the nozzle to be compressed enough that it is not driven radially off its seating under the effect of the high blowing pressure.

In practice, the movable equipment incorporating the nozzle is moved and kept bearing in a sealed fashion against the neck of the parison or the wall of the mold using a pneumatic actuator operated by a fluid under high pressure at least equal to the pressure of the blow-molding fluid, and the fluid delivered to the pneumatic actuator is the blow-molding fluid itself.

Now, from a financial standpoint, producing fluid at high pressure, typically at pressures of $40 \times 10^5$ Pa, represents a very significant item of expenditure in the operation of the entire thermoplastic receptacle (particularly bottle) production line: specifically, the higher the consumption of high-pressure fluid, the more highly specified the compressor needs to be, and therefore the more expensive it is, and furthermore, the higher its electrical power consumption.

Users are nowadays looking for manufacturing systems of improved profitability with higher production rates and lower operating costs. In this context, reducing the amount of high-pressure fluid used by the receptacle manufacturing line and, more particularly, by the blow-molding system, would seem to be desirable.

SUMMARY OF THE INVENTION

It is therefore an object of the invention to meet this expectation and propose a blow-molding system as mentioned hereinabove which consumes appreciably less high-pressure fluid than the current systems.

To these ends, a blow-molding system as mentioned in the preamble is characterized, being in accordance with the invention, in that
  the end wall of the nozzle is formed by said transverse wall of the tubular body, and
  the lateral interior wall of the sleeve is shaped in such a way that fluid pressure inside the nozzle does not generate, on said lateral wall, a reaction force component directed away from said wall of the mold.

Because of the design proposed according to the invention, all the reaction components resulting from the pressure of the blow-molding fluid during the phase of blow-molding the receptacle and which are exerted on the movable equipment are radial and therefore cancel one another out because of the symmetry of revolution of the lateral internal wall of the nozzle and, if there is an axial component, this component is directed toward the wall of the mold and plays a part in holding the nozzle in place. Thanks to this design, the means for moving the movable equipment and for keeping the nozzle in the blow-molding position need to develop a force that is considerably lower than is required in current systems, and therefore can be produced in a scaled-down and simplified form.

In practice, it is advantageous to maintain, as in the earlier systems, pneumatic operation of the movable equipment, by contriving for respective portions of the tubular body and of the movable equipment which face each other to be arranged as an at least single-acting pneumatic actuator for moving the movable equipment along the tubular body in the direction of the mold and holding the nozzle in said sealed communication with the neck of the parison. A result of this is that the nozzle can be kept pressed in a sealed fashion against the neck of the receptacle or against the wall of the mold using a pressure that is appreciably lower than the high pressure of the blow-molding fluid; as for the moving of the movable equipment by the pneumatic actuator, a low pressure driving fluid is sufficient here too. Thus, the movable equipment including the nozzle can be operated (apart from the actual blowing itself) using a relatively low-pressure driving fluid; typically, it will be possible to use compressed air at $7 \times 10^5$ Pa which is commonly available in all industrial facilities.

The design of a blow-molding system according to the invention leads to a substantial saving in high-pressure fluid which can now be reserved simply for the blow-molding phase. A result of this is that it is possible, in order to produce the high-pressure fluid, to use a compressor of an appreciably lower capacity, which is therefore less expensive to purchase and requires less electrical power to run; furthermore, it is less bulky and its smaller size, together with other modifications made to the remainder of the manufacturing system, lead to designs of manufacturing systems which occupy less floorspace.

Although various structural arrangements are conceivable, in a simple and therefore advantageous embodiment, the movable equipment is external to the tubular pipe. It is then advantageous for the pneumatic actuator to comprise a stationary piston formed by a widening of the tubular body and a movable chamber formed by a widening of the movable equipment housing the piston in a sealed fashion.

As a preference, the movable equipment is moved pneumatically not only as it is lowered with the nozzle kept bearing in a sealed manner against the neck of the parison or against the wall of the mold, but also as it is raised once the receptacle has been blown: for these reasons, the pneumatic actuator is a double-acting actuator.

The provisions according to the invention can be applied irrespective of the type of nozzle used; in particular, they can be applied in cases where the nozzle is designed to collaborate positively and in a sealed fashion with the neck of the parison that is to be blow-molded, particularly being engaged in said neck; as a preference, they can be applied in cases where the nozzle is designed in the form of a bell-shaped nozzle having a widened terminal part able to press in a sealed fashion via its transverse face against the wall of the mold while at the same time fitting over the neck of the parison without being in contact therewith.

BRIEF DESCRIPTION OF THE DRAWINGS

The invention will be better understood from reading the detailed description which follows of certain embodiments which are given solely by way of nonlimiting examples. In this description, reference is made to the attached drawings in which.

DETAILED DESCRIPTION OF THE INVENTION

Figure 1:
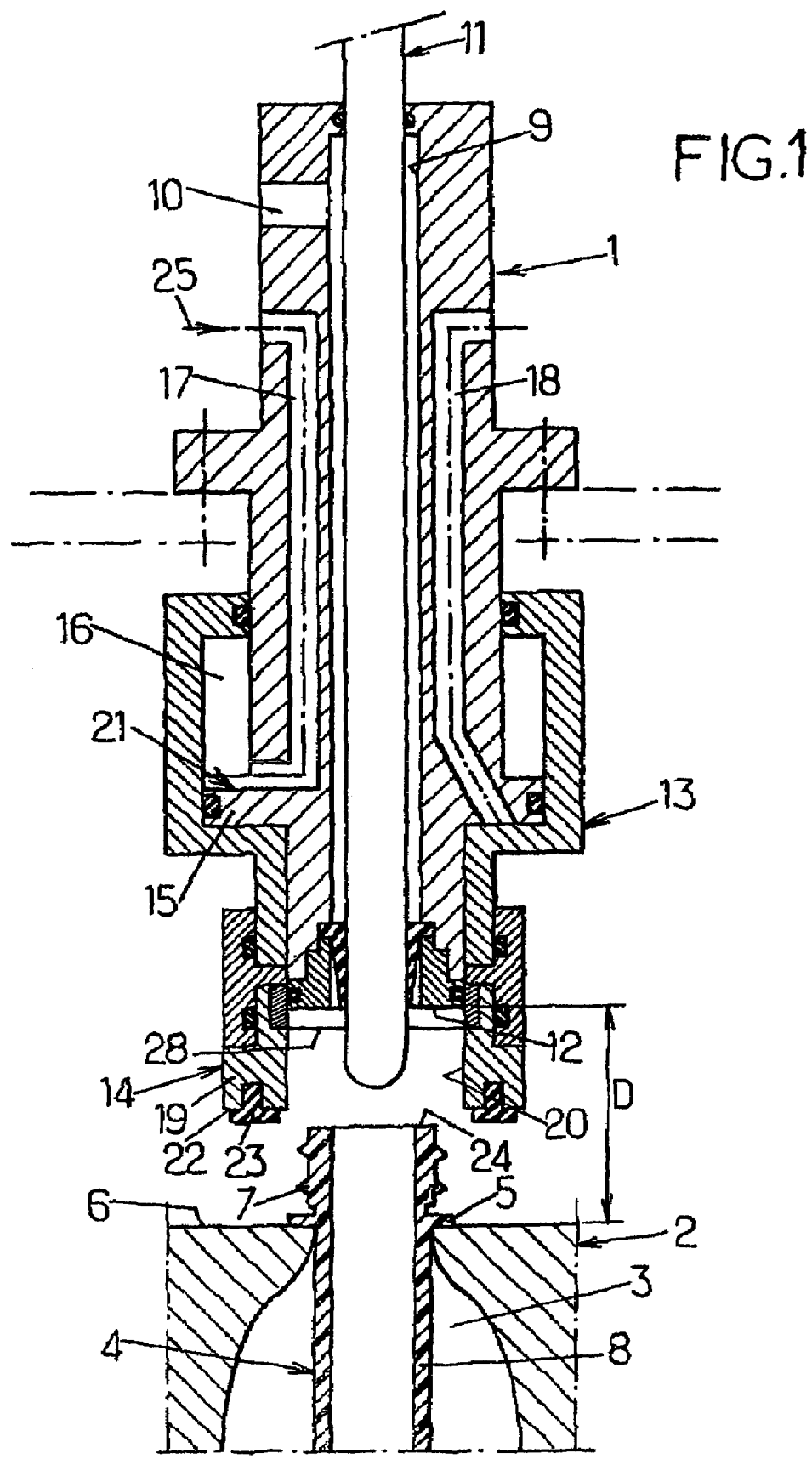
FIG. 1 is a sectioned schematic view of part of a blow-molding system arranged according to a preferred embodiment of the invention and shown in a non-functional position.

FIG. 1, to which reference is made first of all, depicts part of a blow-molding system in which only those elements necessary for understanding the invention are depicted.

The blow-molding system comprises a stationary body 1 supported by a support structure (not depicted) over a mold 2, it too supported in a stationary manner by the same support structure. In practice, this support structure may form part of a revolving structure or carousel combining numerous molds distributed about the circumference and surmounted by respective blow-molding systems. In practice also, the body 1 of the blow-molding system extends more or less vertically above the mold and more or less coaxially with respect to the molding cavity 3 of the mold.

So as to present a more concrete example, a parison 4 (in this instance a preform) has been shown in position in the mold 2 awaiting blowing. The parison 4 is positioned in such a way that it is supported, via its flange 5, on the wall 6 (top wall) of the mold into which the molding cavity 3 opens so that only the neck 7 emerges from the mold whereas only the body 8 of the parison 4 is engaged in the molding cavity 3.

The body 1 is arranged in the form of a tubular body through the entire height of which there passes a bore 9 into which there opens, for example toward its upper end, a radial duct 10 that can be coupled to a source of fluid at high pressure (typically of the order of $40 \times 10^5$ Pa). In general (in the case of a stretch-blow-molding molding process), the bore 9 has a diameter large enough to accommodate a stretching rod 11 passing through it from top to bottom, the stretching rod being supported moved by means which have not been depicted in order to stretch the parison 4 axially at a point in the stretch-blow-molding process, generally at the beginning thereof.

The upper and lower ends of the bore 9 are shaped to guide the stretching rod in a sealed manner in its axial movement.

This being the case, the body 1 is, in its entirety, in the form of a stationary tubular pipe which has an annular transverse face 12 (through which the stretching rod 11 passes) and which, because the body 1 and the mold 2 are supported by the same support structure, is a fixed distance D from the wall 6 facing it of the mold 2.

The body 1 coaxially and with sliding supports movable equipment 13 comprising a blowing nozzle 14.

Although the movable equipment can be moved and the nozzle held in the blowing position in any way (using mechanical, electromagnetic, pneumatic, means), it is preferable for this to be done pneumatically. To these ends, respective portions facing one another belonging to the body 1 and to the movable equipment 13 are arranged as an at least single-acting pneumatic actuator 21 for moving the movable equipment 13 along the body 1 toward the mold and for keeping the nozzle in sealed communication with the neck 7 of the parison 4.

In the simple and preferred embodiment illustrated in FIG. 1, the movable equipment 13 surrounds the body 1 and the pneumatic actuator 21 comprises a stationary piston 15 formed by a part of increased diameter, or a widening, of the body 1 and a movable chamber 16 formed by a part of increased diameter of the movable equipment 13 which in sealed fashion houses the piston 15. A duct 17 opens laterally into the upper part of the body 1 and, running parallel to the axial bore 9, opens radially from the lateral wall of the body 1 into the chamber 16 level with the upper face of the piston 15, so as to drive the movable equipment 13 downward.

The pneumatic actuator 21 formed by the piston 15 and the chamber 16 is preferably a double-acting actuator so that the movable equipment 13 can be raised back up, after blowing, also pneumatically. To these ends, a second duct 18 is provided in the body 1 with an arrangement similar to that of the duct 17, except that it opens at the bottom into the chamber 16 in the lateral face of the body level with the upper face of the piston 15.

According to the invention, the nozzle 14 is defined, laterally, by a sleeve-shaped terminal part 19 of the movable equipment 13 and its end wall is formed solely of the aforesaid transverse face of the body 1. Furthermore, the lateral interior wall 20 of the sleeve is shaped in such a way that fluid pressure within the nozzle does not give rise, on this lateral interior wall 20, to any reaction force component directed away from the wall 6 of the mold 2 (that is to say upward in FIG. 1).

In other words, the only surface subjected, when a fluid pressure is present, to an upwardly-directed force is the transverse face 12 of the body 1 which, because of the structure of the system, is stationary with respect to the wall 6 of the mold 2, whereas all the surfaces of the sleeve 19 are subjected to no upwardly-directed force component. Hence, when the blow-molding fluid is introduced, the nozzle does not tend to be pushed up from its functional position and remains pressed against the wall 6 of the mold 2, and remains so irrespective of the pressure of the fluid let in.

One important consequence of this is that the nozzle is held in the functional position during blow-molding by applying a relatively low retaining force to the movable equipment. In practice, what this means is that the pneumatic actuator 21 can be supplied with a relatively low pressure fluid (typically a fluid at the industrial pressure of $7 \times 10^5$ Pa commonly available in workshops), instead of the very high pressure (typically $40 \times 10^5$ Pa) of the blow-molding fluid hitherto used for this purpose.

In the exemplary embodiment illustrated more specifically in FIG. 1, the lateral interior wall 20 of the sleeve 19 is typically a cylinder of revolution, with a diameter significantly greater than the exterior diameter of the neck 7 of the parison, which means that the transverse face 22 (which is fitted with an annular seal 23) of the sleeve bears in sealed contact with the wall 6 of the mold when the nozzle is brought into the functional position, the lateral interior wall 20 being distant from the neck 7 (bell-nozzle).

For guidance, it will be noted that the sleeve 19 preferably consists of an assembly of several parts so that a thin and elastic diaphragm 28, pierced for the passage of the stretching rod 11 and of the blow-molding fluid is held inside the nozzle. The purpose of this diaphragm is to bear elastically against the mouth 24 of the neck 7 so as to keep the parison 4 in the correct position in which it is more or less coaxially aligned with the stretching rod 11 and prevent it from lifting when the high-pressure blow-molding fluid is introduced.

It may be emphasized that the arrangement just described is structurally very simple and that the movable equipment 13 may be of small height (the sleeve 19 following on immediately from the part defining the chamber 16 of the pneumatic actuator 21): the movable equipment 13 therefore has low inertia, something which is advantageous from the viewpoint of a system that operates at high throughput rates.

It will also be noted that the body 1, which is the part which has the greatest vertical development, is a stationary part which can be secured to the support structure in any appropriate way able to give it perfect stability. The movable equipment 13 that it slideably supports is therefore assured of precise guidance, in spite of the functional clearances necessary for it to move, and this guidance, combined with the relatively short travel, means that the nozzle can be positioned accurately in the functional blowing position.

FIG. 1 illustrates the blow-molding system in a non-functional position, with the movable equipment 13 in the raised position in which the transverse face 22 of the sleeve 19 and the seal 23 are located above the level of the mouth 24 of the neck of the parison 4. The movable equipment 13 is brought into and held in this position by injecting low-pressure fluid into the duct 17 (arrow 25).

Figure 2:
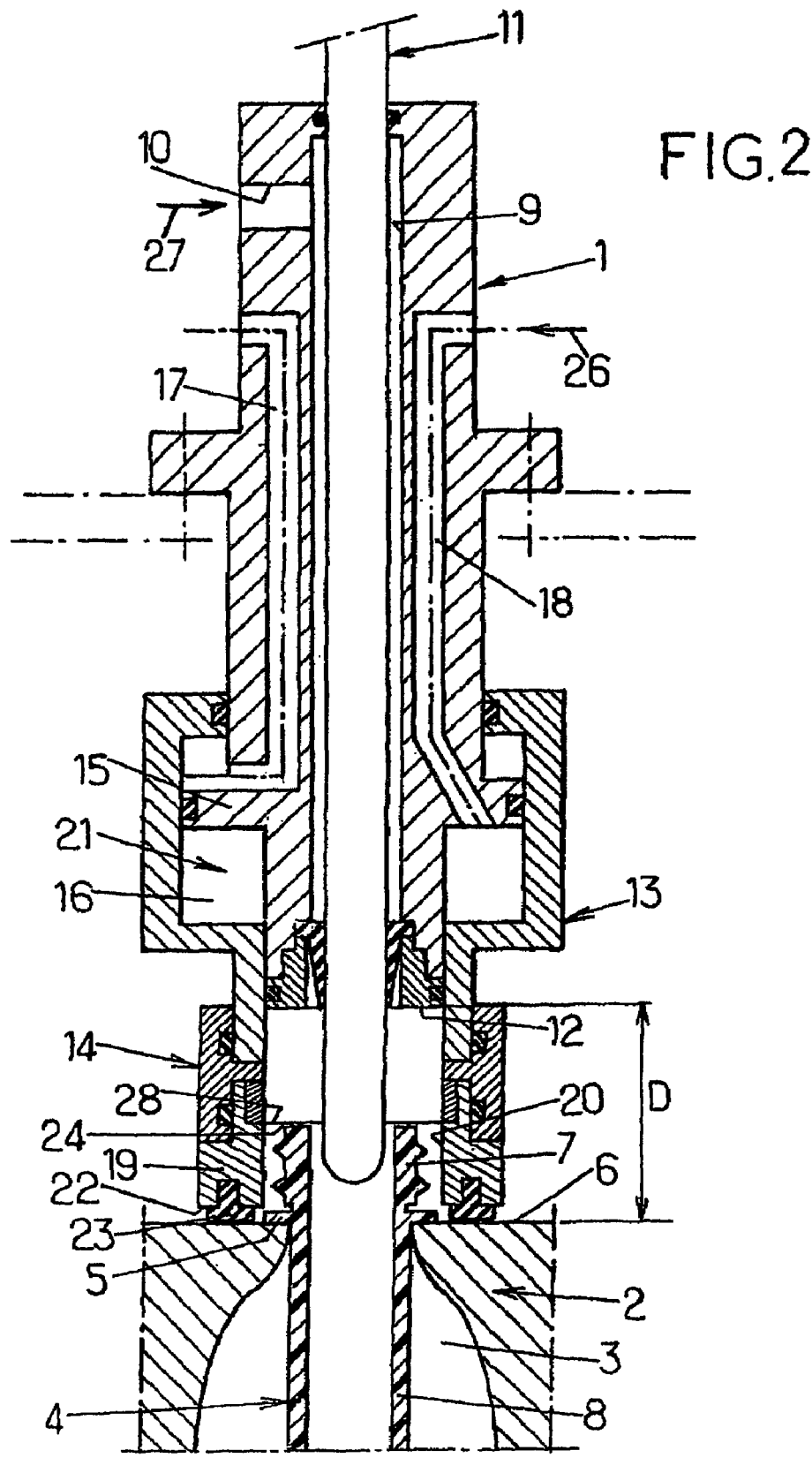
FIG. 2 is a sectioned schematic view of the blow-molding system of FIG. 1, shown in a functional position.

FIG. 2 illustrates the blow-molding system in the functional position, with the movable equipment 13 in the lowered position in which the seal 23 is clamped between the transverse face 22 of the sleeve 19 and the wall 6 of the mold 2, thus providing sealing. The movable equipment 13 is brought into and kept in this position by injecting low-pressure fluid into the duct 18 (arrow 26). The high-pressure blow-molding fluid can then be introduced (arrow 27) into the bore 9 and the nozzle.

The arrangements according to the invention have just been described more specifically in the context of a blow-molding system equipped with a bell-shaped nozzle, this type of system being in widespread use because of its attractive advantages. However, the arrangements according to the invention are not exclusive to the use of a bell-shaped nozzle and may also be associated with other types of nozzle (nozzles engaged inside the neck of the parison, nozzles butting against the mouth of the neck of the parison).

Figure 3:
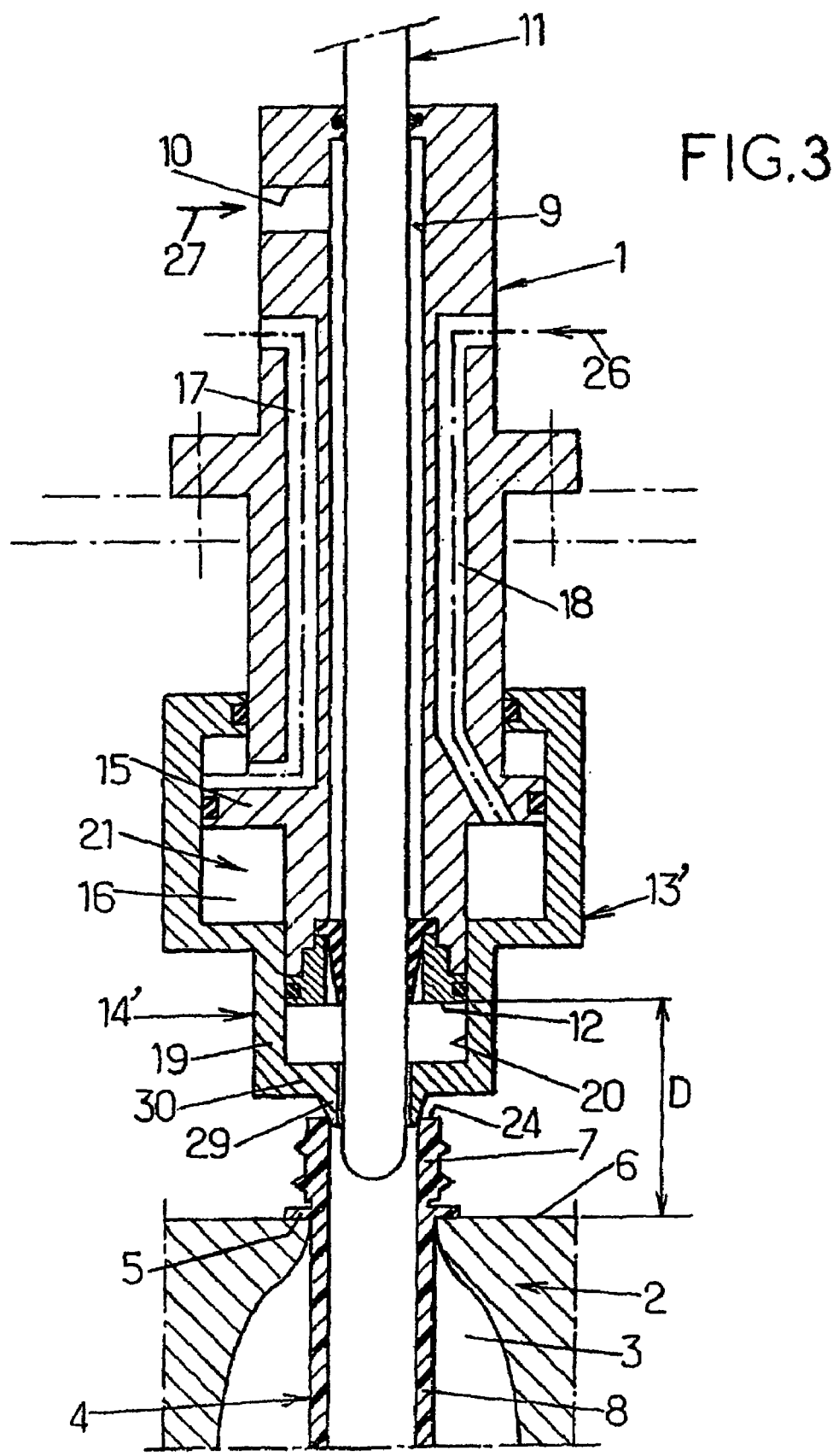
FIGS. 3 and 4 are sectioned schematic views of two embodiment variants of a blow-molding system according to the invention, both shown in a functional position.

By way of example, FIG. 3 illustrates a blow-molding system arranged in accordance with the invention and which again adopts the same structure as the system of FIG. 1, except for the shaping of the nozzle. In FIG. 3, the nozzle 14' is designed to be engaged inside the neck 7 of the parison 4 and to these ends its terminal part is shaped in the form of a downwardly-projecting annular skirt 29, the external face of which is frustoconical and able to be forcibly inserted against the interior edge of the mouth 24 of the neck 7 of the parison 4. The skirt 29 is borne by an end wall 30, running transversely. The remainder of the movable equipment 13' may be identical to that in FIG. 1.

In such an embodiment, the pressure of the blow-molding fluid is applied to the internal face of the end wall 30 so that the corresponding force combines with the force developed by the pneumatic actuator 21 to keep the nozzle pressed against the mouth 24.

In an embodiment variant, the end wall 30, instead of being transverse, could be frustoconical with its conicity facing downward, with similar results.

An arrangement more or less analogous with that of FIG. 3 could be adopted in the case of a nozzle able to be butted against the mouth 24.

In the above description, the arrangements according to the invention call for movable equipment 13 arranged externally to the stationary body 1, because that is the arrangement that is the simplest and easiest to produce with parts of relatively simple shapes that are inexpensive to machine. Furthermore, this arrangement allows the chamber delimited by the nozzle, when the latter is in a functional position, to have the smallest possible volume compatible with the dimensions of the neck of the parison, thus playing a part in saving on blow-molding fluid: indeed it should be noted that it is blow-molding air which is conveyed into the volume of the nozzle and which adds to the volume needed to form the receptacle. Thus, if the volume of the chamber delimited by the nozzle is of the order of 30 cm$^3$, blow-molding at a pressure of $40 \times 10^5$ Pa entails compressing 12 liters of additional air simply to fill the nozzle.

Figure 4:
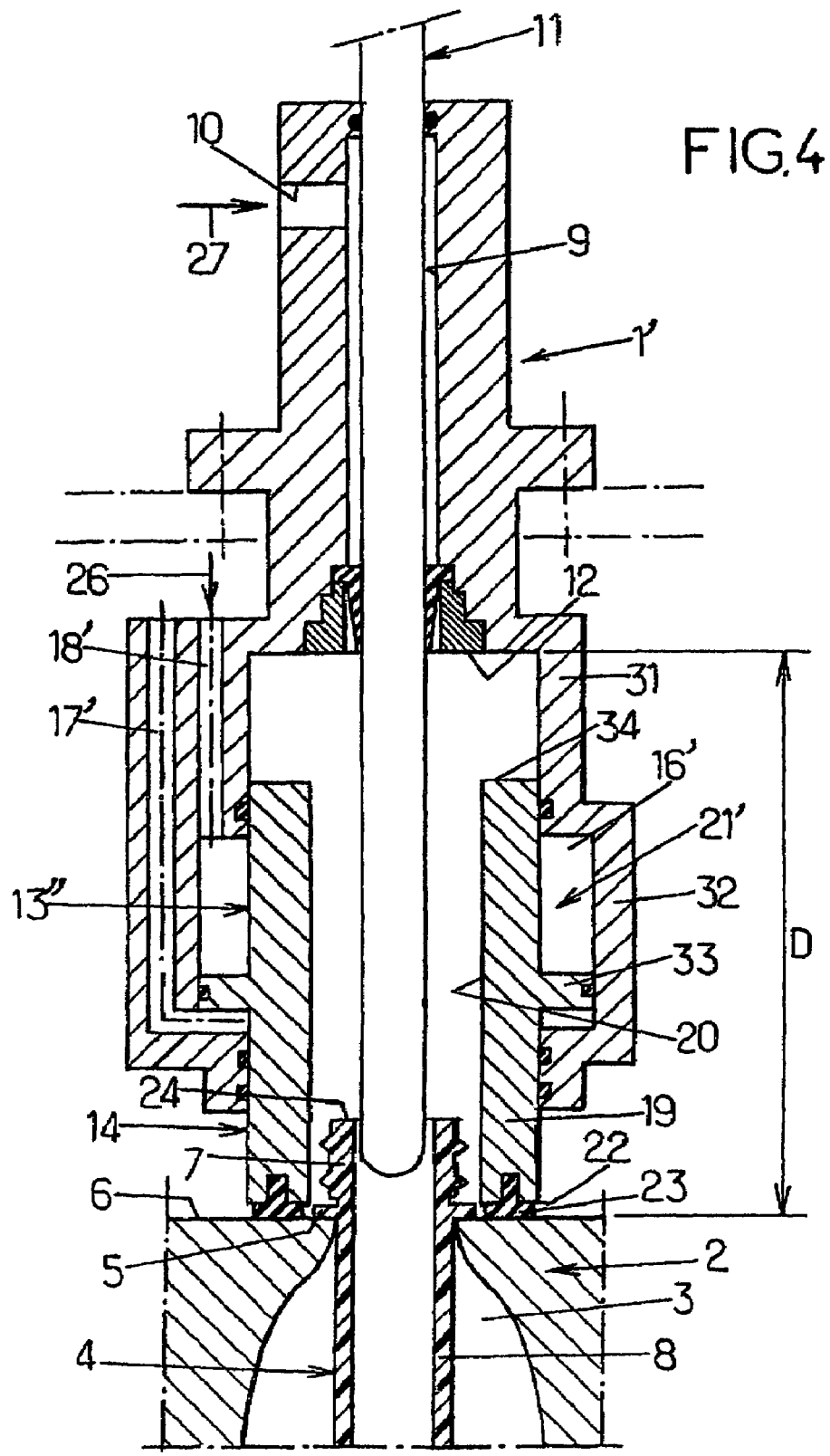

However, this technical solution is not the only conceivable one and, should it prove necessary to do so, although this would be less advantageous in terms of air consumption, it would be possible to use movable equipment internal to the stationary body, as illustrated in FIG. 4, in conjunction with a nozzle of the bell-shaped nozzle type. It should be noted that the nozzle could be of the type 14' shown in FIG. 3.

The stationary body 1' is arranged at its lower end in a widened form with a wall 31 which acts internally as a guide for the movable equipment 13" that it houses. The wall 31 is itself locally widened (at 32) to define an annular chamber 16' at the ends of which there open two ducts 17', 18' hollowed from the wall 31. The movable equipment 13" is in the overall form of a tubular member that is a cylinder of revolution comprising an external annular projection forming a piston 33 housed in sealed fashion in the chamber 16' defined by the wall 32. At its lower part, the aforesaid tubular member is arranged as illustrated in FIG. 1 to form the nozzle 14 analogous with the one described above. It will be noted that, in this embodiment also, the pressure of the blow-molding fluid generates, on the upper annular transverse wall 34 of the movable equipment 13', a downwardly directed force, which plays a part in keeping the nozzle pressed in sealed fashion against the wall 6 of the mold.

The invention claimed is:

1. A blow-molding system able to convey a blow-molding fluid at high pressure into a thermoplastic parison which is supported, in a blow-molding mold, by its neck emerging from a wall of the mold, said system comprising a stationary tubular body which is in communication with a source of high-pressure fluid and which, at its lower end, coaxially and slidably supports movable equipment comprising a blowing nozzle able, in the blowing position, to be placed in sealed communication with the neck of the parison, the nozzle being laterally defined by a terminal part, in the form of a sleeve, of the movable equipment, the tubular body having a transverse face which lies a fixed distance from the aforementioned wall of the mold, wherein
    the wall of the nozzle is formed by said transverse wall of the tubular body, and wherein
    the lateral interior wall of the sleeve is shaped in such a way that fluid pressure inside the nozzle does not generate, on said lateral wall, a reaction force component directed away from said wall of the mold.

2. The blow-molding system as claimed in claim 1, wherein respective portions of the tubular body and of the movable equipment which face each other are arranged as an at least single-acting pneumatic actuator for moving the movable equipment along the tubular body in the direction of the mold and holding the nozzle in said sealed communication with the neck of the parison.

3. The blow-molding system as claimed in claim 1, wherein the movable equipment is external to the tubular pipe.

4. The blow-molding system as claimed in claim 3, wherein respective portions of the tubular body and of the movable equipment which face each other are arranged as an at least single-acting pneumatic actuator for moving the movable equipment along the tubular body in the direction of the mold and holding the nozzle in said sealed communication with the neck of the parison, and
    wherein the pneumatic actuator comprises a stationary piston formed by a widening of the tubular body and a movable chamber formed by a widening of the movable equipment housing the piston in a sealed fashion.

5. The blow-molding system as claimed in claim 1, wherein the movable equipment is internal to the tubular pipe formed in the stationary body.

6. The blow-molding system as claimed in claim 5, wherein respective portions of the tubular body and of the movable equipment which face each other are arranged as an at least single-acting pneumatic actuator for moving the movable equipment along the tubular body in the direction of the mold and holding the nozzle in said sealed communication with the neck of the parison, and
    wherein the pneumatic actuator comprises a stationary chamber formed by a widening of the tubular body and a movable piston formed by a widening of the movable equipment housed in a sealed fashion in the chamber.

7. The blow-molding system as claimed in claim 2, wherein the pneumatic actuator is a dual-acting actuator.

8. The blow-molding system as claimed in claim 2, wherein the control fluid that operates the pneumatic actuator is a low-pressure fluid.

9. The blow-molding system as claimed in claim 1, wherein the nozzle is designed to collaborate positively and in a sealed fashion with the neck of the parison that is to be blow-molded, particularly being engaged in said neck.

10. The blow-molding system as claimed in claim 1, wherein the nozzle is designed in the form of a bell-shaped nozzle having a widened terminal part able to press in a sealed fashion via its transverse face against the wall of the mold while at the same time fitting over the neck of the parison without being in contact therewith.

11. The blow-molding system as claimed in claim 10, wherein the transverse face of the widened terminal part of the nozzle is fitted with a seal which, when the nozzle is in the functional position, is clamped between the transverse face of the sleeve and the wall of the mold so as to ensure sealing.

\* \* \* \* \*